Sept. 5, 1939.  F. R. POWELL  2,172,130
HOSE PROTECTOR
Filed Aug. 30, 1938  2 Sheets-Sheet 2
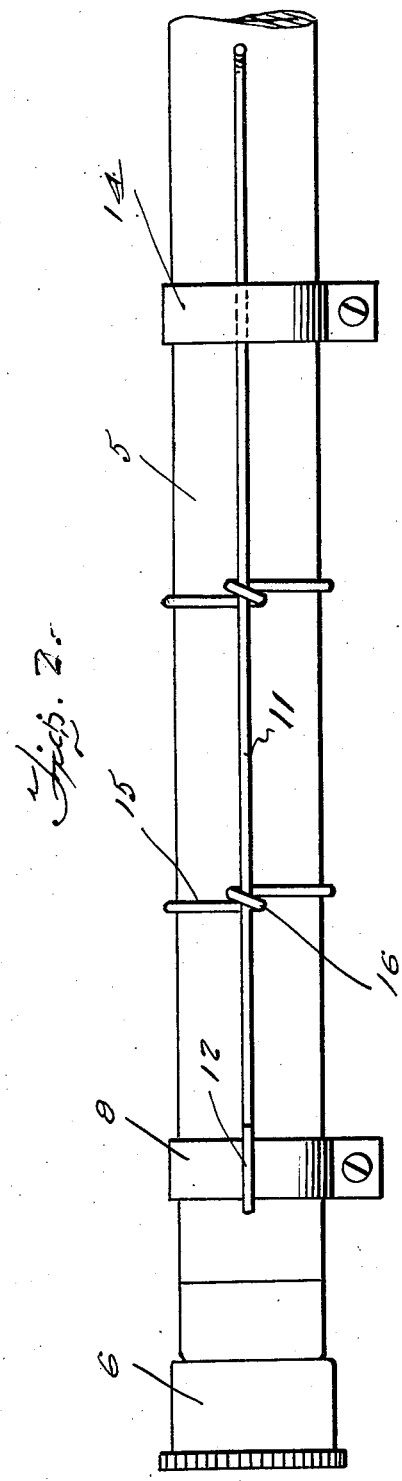
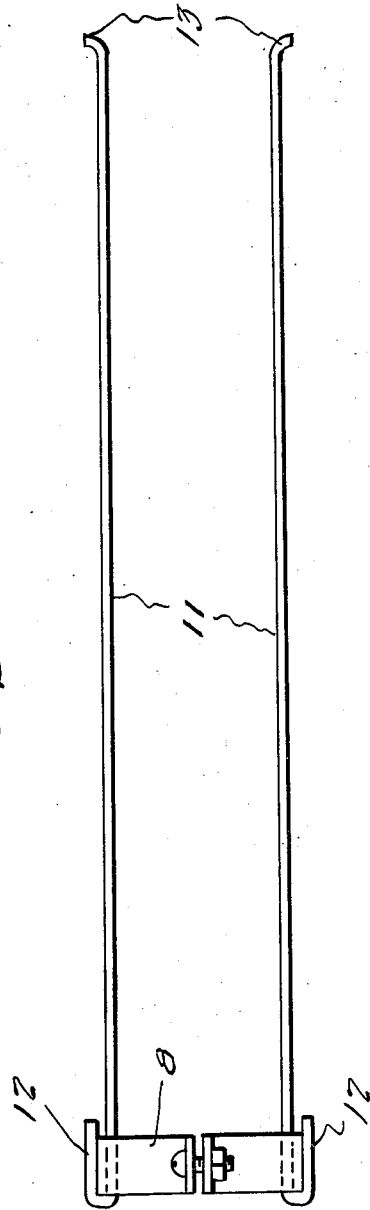
Inventor
F. R. Powell
By Clarence A. O'Brien
and Hyman Berman
Attorneys Patented Sept. 5, 1939

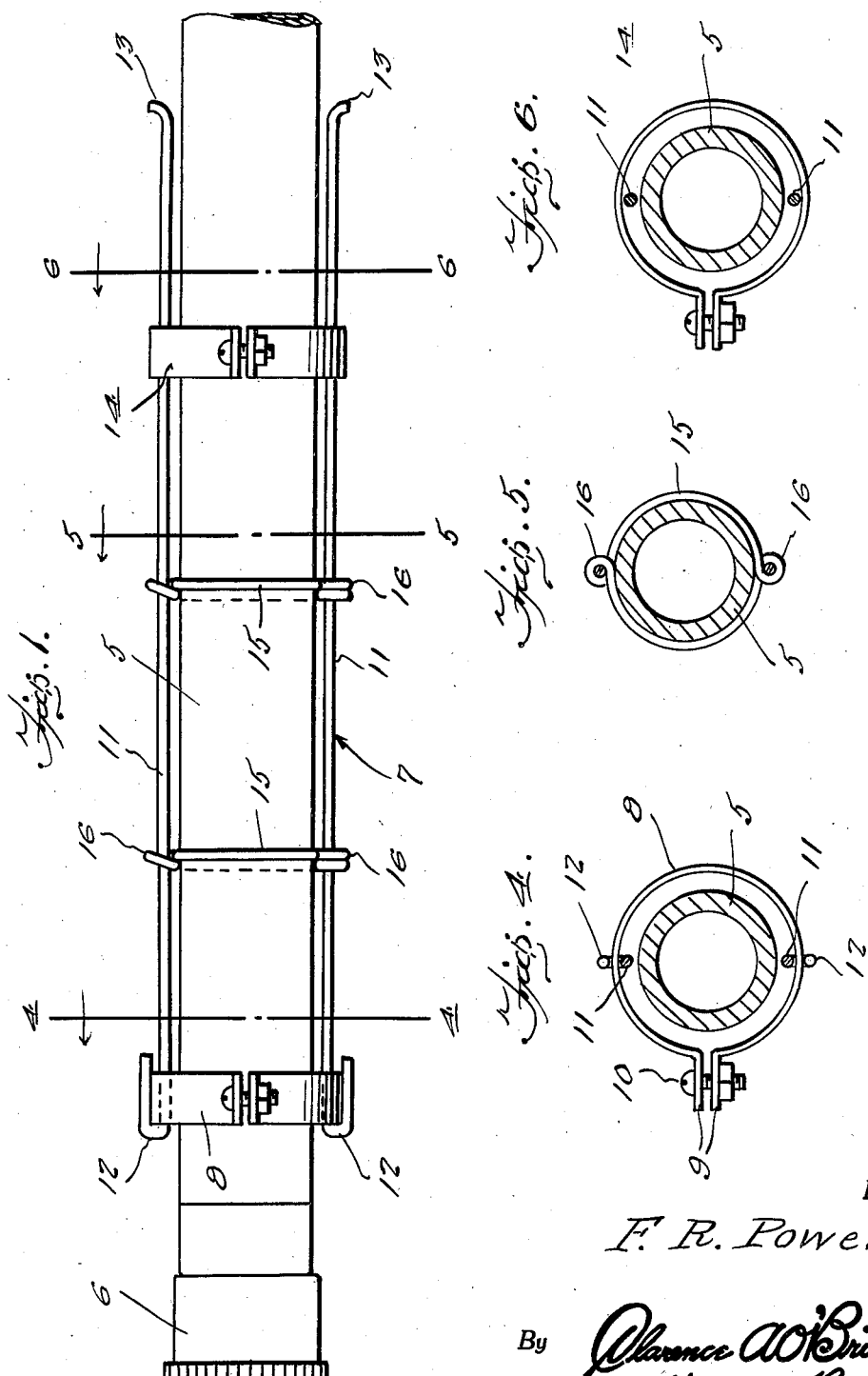

2,172,130

UNITED STATES PATENT OFFICE 2,172,130

HOSE PROTECTOR

Frank R. Powell, Macon, Ga.

Application August 30, 1938, Serial No. 227,558

1 Claim. (Cl. 138—61)

This invention consists in the provision of a device for ready attachment to a garden hose adjacent the coupling-equipped end thereof for preventing a bending of the hose at said end to an extent normally resulting in the rupturing of the hose and consequent leaking of the hose.

The invention together with its objects and advantages will be best understood from a study of the following description taken in connection with the accompanying drawings wherein—

Figure 1 is a side elevational view illustrating the application of the invention to a hose.

Figure 2 is a top plan view illustrating the application of the invention.

Figure 3 is a side elevational view of the guard with certain parts omitted.

Figures 4, 5 and 6 are transverse sectional views taken substantially on the lines 4—4, 5—5 and 6—6, respectively, of Figure 1.

Referring to the drawings by reference numerals it will be seen that 5 indicates one end portion of a hose, and which hose at said one end is equipped with a conventional coupling 6 through the medium of which said end of the hose is connected with a water faucet or the like.

My improved hose guard is indicated generally by the reference numeral 7.

In the preferred embodiment thereof the guard 7 comprises a split ring 8 which at the ends thereof, formed by the split, is provided to present apertured lugs 9 accommodating a nut-equipped bolt 10 through the medium of which the clamp 8 is secured adjacent the hose end 5 in proximity to the coupling 6.

Further the guard 7 comprises upper and lower elongated rods 11 one of which is adapted to extend longitudinally of the hose end 5 at the upper side of the hose and the other of which is to extend longitudinally of the hose end 5 at the bottom side of the hose.

At one end thereof the rods 11 are formed to provide hooks 12 engaging the clamp 8 at diametrically opposite sides of the clamp. Preferably the hook ends 12 of the rods 11 are welded or otherwise made fast to the clamp 8.

At the free ends thereof the rods 11 are curved slightly outwardly as at 13 to prevent accidental complete disengagement therefrom of a sliding split clamping band or ring 14 which is substantially identical with the clamping band or ring 8 and which serves to draw the free ends of the rods 11 inwardly towards the hose 5.

For maintaining the rods relatively rigid there are provided two or more rings 15.

Each ring 15 is preferably formed from a single length of wire and at diametrically opposite sides thereof the wire is twisted to provide integral eyes 16 through which the side rods 11 of the guard are extended as shown. Obviously the rings 15 may be shifted longitudinally of the rods 11 to the desired position of adjustment and these rings 15 serve to prevent buckling or curving of the rods 11 and thus cooperate with the other mentioned parts of the guard to hold the said end of the hose 5 straight and against being bent at an angle injurious to the hose.

As is well-known, the end of the hose, attached to a faucet, is, when in use, sometimes caused to bend to an extreme degree with the result that a rupture soon appears in the material of the hose at the bent portion thereof thus damaging the hose to a serious extent and sometimes requiring a cutting off of a material portion of the length of the hose before the latter can be properly repaired.

The many advantages of a guard embodying the features of the present invention will readily present themselves to those skilled in the art.

It is thought that a clear understanding of the construction, utility and advantages of the invention will accordingly be had without a further detailed description thereof.

Having thus described the invention what is claimed as new is:

In combination with a hose, a split band embracing said hose, rods disposed at diametrically opposite sides of the hose and having at one end hooks embracing said split band, a second split band embracing said hose and said rods at a point on the latter remote from the first-named split band, and rings sleeved on the hose, said rings being each, at diametrically opposite points, provided with eyes through which said rods extend in spaced relation to said hose.

FRANK R. POWELL.